United States Patent
Mochizuki et al.

(10) Patent No.: US 9,278,646 B2
(45) Date of Patent: Mar. 8, 2016

(54) DRIVING SUPPORT APPARATUS FOR VEHICLE

(71) Applicant: Koito Manufacturing Co., Ltd., Tokyo (JP)

(72) Inventors: Kiyotaka Mochizuki, Shizuoka (JP); Satoshi Yamamura, Shizuoka (JP); Takayuki Yagi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 14/615,565

(22) Filed: Feb. 6, 2015

(65) Prior Publication Data

US 2015/0224926 A1 Aug. 13, 2015

(30) Foreign Application Priority Data

Feb. 13, 2014 (JP) ................. 2014-025063

(51) Int. Cl.
| | |
|---|---|
| G06F 7/00 | (2006.01) |
| B60R 1/00 | (2006.01) |
| G06K 9/00 | (2006.01) |
| G01B 11/25 | (2006.01) |
| G06K 9/32 | (2006.01) |

(52) U.S. Cl.
CPC .............. *B60R 1/00* (2013.01); *G06K 9/00798* (2013.01); *B60R 2300/205* (2013.01); *B60R 2300/302* (2013.01); *B60R 2300/308* (2013.01); *B60R 2300/804* (2013.01); *B60R 2300/8093* (2013.01); *G01B 11/25* (2013.01); *G06K 9/32* (2013.01); *G06K 9/3241* (2013.01)

(58) Field of Classification Search
CPC ..... G08G 1/16; G08G 1/167; G06K 9/00798; G06K 9/32; G06K 9/3241; G01B 11/25; B60R 1/00; B60R 2300/205; B60R 2300/302; B60R 2300/8093; B60R 2300/804
See application file for complete search history.

(56) References Cited

U.S. PATENT DOCUMENTS

| | | | | |
|---|---|---|---|---|
| 8,359,155 B2 * | 1/2013 | Kimura | ............... | B60W 30/025 180/167 |
| 2013/0243247 A1 * | 9/2013 | Sakaue | ................. | G01B 11/25 382/103 |
| 2015/0054638 A1 * | 2/2015 | Ogawa | .................. | G08G 1/167 340/439 |

FOREIGN PATENT DOCUMENTS

| | | |
|---|---|---|
| JP | 2010-026759 A | 2/2010 |
| JP | 2011-207349 A | 10/2011 |

* cited by examiner

*Primary Examiner* — Behrang Badii
(74) *Attorney, Agent, or Firm* — Abelman, Frayne & Schwab

(57) ABSTRACT

Disclosed is, a driving support apparatus which includes a projecting unit configured to project a predetermined support pattern on a road surface ahead of an own vehicle; and a driving support control unit configured to control a projection state of the support pattern. The driving support control unit is configured to detect information of a road on which the own vehicle is travelling by a road information detecting unit, to detect a traveling state of the own vehicle by a travelling state detecting unit, the traveling state including at least one of a vehicle speed and a steering direction, to determine a proper vehicle speed and proper steering based on the detected road information and the detected traveling state by determining units, and to project the support pattern as a moving image based on the determination by a projection control unit.

12 Claims, 6 Drawing Sheets

DRIVING SUPPORT APPARATUS FOR VEHICLE

CROSS-REFERENCE TO RELATED APPLICATIONS

This application is based on and claims priority from Japanese Patent Application No. 2014-025063, filed on Feb. 13, 2014, with the Japan Patent Office, the disclosure of which is incorporated herein in its entirety by reference.

TECHNICAL FIELD

The present disclosure relates to an apparatus for supporting driving in vehicles such as, for example, automobiles or motorcycles. More particularly, the present disclosure relates to a driving support apparatus capable of supporting proper driving by a driver by projecting a supporting pattern to a viewing area of the driver.

BACKGROUND

A technology for supporting driving of an automobile has been proposed in which an image including information effective for supporting driving is projected and drawn on a road surface so that a driver may drive the automobile by visually recognizing the image. Japanese Patent Laid-Open Publication No. 2010-26759 discloses a technology of detecting a lane on which an own vehicle is travelling, and determining whether the own vehicle deviates from the detected lane. When there is a risk of deviation from the lane, information or an image for alerting the deviation from the lane is projected and displayed on the road surface ahead of the own vehicle. Japanese Patent Laid-Open Publication No. 2011-207349 discloses a technology of recognizing a vehicle speed suitable for an own vehicle based on information on a road on which the own vehicle is travelling, and travelling information such as, for example, a speed of the own vehicle. When it is determined that it is preferable to slow down the own vehicle, light distribution of a head lamp is controlled such that visibility at a far front area of the own vehicle is reduced.

SUMMARY

Both technologies disclosed in Japanese Patent Laid-Open Publication Nos. 2010-26759 and 2011-207349 are intended to call on attention of a driver or warn the driver, in order to ensure safe travelling of an own vehicle. Accordingly, when the driver is overconfident in his or her driving technique, especially when the driver considers that the own vehicle is safely traveling while visually recognizing the front area of the own vehicle, the driver often does not accept the attention calling or the warning passively, thereby putting the own vehicle in danger. For example, when the driver pays attention to only the front area while travelling on a highway, the driver may not realize that the speed of the own vehicle exceeds the speed limit. Then, when a deceleration operation is delayed, the own vehicle may rear-end a preceding vehicle. Even when the driver is steering along a lane on a road having partitioned lanes, the own vehicle may immediately deviate from the lane because the vehicle speed is faster than an intended vehicle speed.

An object of the present disclosure is to provide a driving support apparatus for a vehicle in which a driver is forced to delude himself/herself when visually recognizing the front area of the own vehicle, so that he or she may perform a driving operation to cope with the delusion, thereby ensuring safe traveling of the own vehicle.

The driving support apparatus of the present disclosure includes: a projecting unit configured to project a predetermined support pattern on a road surface ahead of an own vehicle or a front window of the own vehicle; and a driving support control unit configured to control a projection state of the support pattern. The driving support control unit includes: a road information detecting unit configured to detect information of a road on which the own vehicle is travelling; a travelling state detecting unit configured to detect a traveling state of the own vehicle, the traveling state including at least one of a vehicle speed and a steering direction; a proper state determining unit configured to determine a proper vehicle speed and proper steering of the own vehicle based on the information of the road and the traveling state; and a projection control unit configured to project the support pattern as a moving image based on determination by the proper state determining unit. Here, the moving image refers to an image which moves with variable projection positions with respect to the own vehicle, or an occupant of the own vehicle, especially the driver. The movement of the image may be continuous or intermittent.

In the present disclosure, the projection control unit is configured to control the projecting unit to project the support pattern as a moving image moving in forward and backward directions of the own vehicle, or as a moving image moving in left and right directions of the own vehicle. The projection control unit is configured to control the projecting unit to project the support pattern as a moving image moving in the forward and backward directions of the own vehicle when the vehicle speed of the own vehicle is out of the proper vehicle speed. The projection control unit is configured to control the projecting unit to project the support pattern as a moving image moving in the left and right directions of the own vehicle when the steering direction of the own vehicle is out of the proper steering.

According to the present disclosure, the proper state determining unit determines a proper travelling state of the own vehicle based on the travelling road information and the travelling state of the own vehicle. Based on the determination, the projection control unit controls the projecting unit to project the supporting pattern on the front road surface or the front window of the own vehicle as a moving image moving in the forward and backward directions or in the left and right directions. Accordingly, the driver visually recognizing the supporting pattern may delude himself/herself about the vehicle speed or the steering direction of the own vehicle, and may perform a vehicle speed operation or a steering operation to cope with the delusion. Thus, safe travelling may be ensured or traffic jam may be avoided in advance.

According to the present disclosure, when the supporting pattern is projected as a moving image moving in the forward and backward directions of the own vehicle, the driver may delude himself or herself about the vehicle speed of the own vehicle, and may perform a deceleration operation or an acceleration operation based on the delusion to change the vehicle speed, thereby ensuring the proper vehicle speed. Then, safe travelling and traffic jam suppression may be achieved. When the supporting pattern is projected as a moving image moving in the left and right directions of the own vehicle, the driver may delude himself or herself about the steering direction of the own vehicle, and may perform an operation to change the steering direction, thereby ensuring the proper travelling direction of the own vehicle. Then, safe travelling may be achieved.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The exemplary embodiments described in the detailed description, drawing, and claims are not meant to be limiting. Other exemplary embodiments may be utilized, and other changes may be made, without departing from the spirit or scope of the subject matter presented here.

Figure 1:
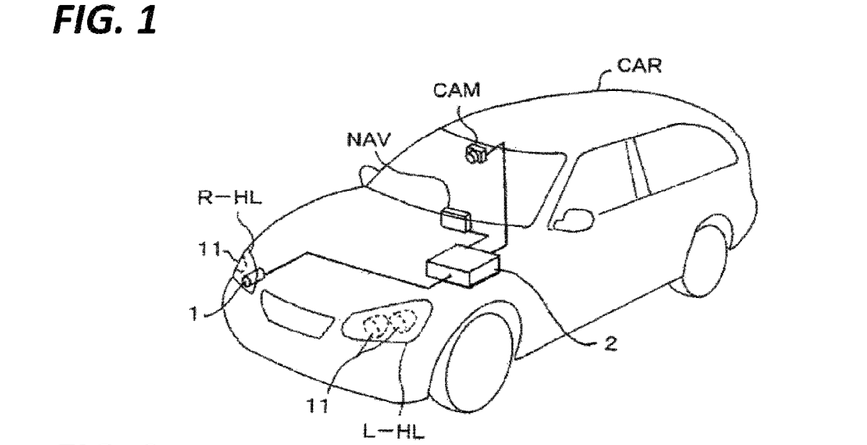
FIG. 1 is a schematic perspective view illustrating an automobile equipped with a driving support apparatus of the present disclosure.

Hereinafter, exemplary embodiments of the present disclosure will be described with reference to drawings. FIG. 1 is a schematic perspective view illustrating an automobile CAR equipped with a driving support apparatus of the present disclosure. A projector 1 serving as a projecting unit of the present disclosure is embedded in one of left and right head lamps L-HL and R-HL of the automobile CAR (herein, the right head lamp R-HL). The projector 1 is connected to a driving support electronic control unit (ECU) 2 which serves as a driving support control unit of the present disclosure, and is configured to project a required supporting pattern on a road surface in a front area of the automobile CAR under the control of the driving support ECU 2.

Figure 2:
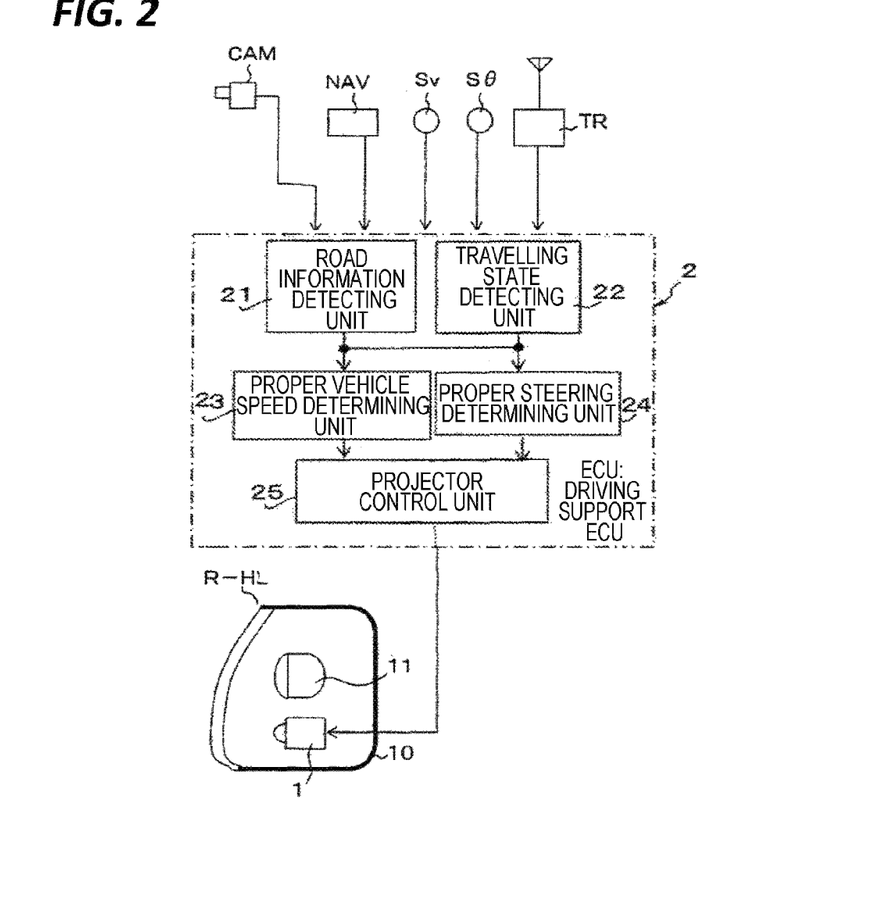
FIG. 2 is a block diagram illustrating a configuration of the driving support apparatus of the present disclosure.

FIG. 2 is a block diagram illustrating a configuration of the driving support apparatus. The projector 1 is provided within a lamp housing 10 independently from a lamp unit 11 of the right head lamp R-HL, and is configured to project a supporting pattern at an arbitrary timing regardless of lighting or non-lighting in the lamp unit 11. As for the projector 1, a conventional projector may be used. Thus, detailed descriptions of the projector 1 will be omitted herein. The projector 1 is configured to project an image with a light intensity at which the projected supporting pattern may be visually recognized by a driver not only at nighttime but also at daytime.

The driving support ECU 2 is connected to a photographing camera CAM provided at a location facing the front glass of the automobile (which may be referred to as an "own vehicle") CAR and configured to capture a front area of the own vehicle, a navigation device (NAV) mounted on the own vehicle, and a road-to-vehicle communication device (TR) configured to obtain road information by performing so-called road-to-vehicle communication with various road facilities provided on a road where the own vehicle is travelling. Also, the driving support ECU 2 is connected to a vehicle speed sensor Sv configured to detect a speed of the own vehicle, and a steering angle sensor Sθ configured to detect a steering angle of a steering wheel operated by the driver.

The driving support ECU 2 is provided with a road information detecting unit 21 configured to detect information of a road where the own vehicle is travelling from the front area image captured by the photographing camera CAM. The road information includes, for example, information on slopes, tunnels, curved paths or straight paths, and information on road signs present on the road and lane lines marked on the road surface. The road information detecting unit 21 is configured to detect other vehicles present around the own vehicle (that is, preceding vehicles, parallel running vehicles, and oncoming vehicles) as a part of the road information from the image captured by the photographing camera CAM.

The driving support ECU 2 is provided with a travelling state detecting unit 22 configured to detect the traveling state of the own vehicle by detecting a steering direction of the own vehicle, that is, a traveling direction, from the output of the steering angle sensor Sθ, and detecting a current speed of the own vehicle from the output of the vehicle speed sensor Sv.

The driving support ECU 2 is provided with a proper vehicle speed determining unit 23 and a proper steering determining unit 24 configured to determine a proper vehicle speed and a proper steering direction for the own vehicle, based on the road information detected by the road information detecting unit 21 and the own vehicle travelling state detected by the travelling state detecting unit 22. The proper vehicle speed determining unit 23 detects a proper vehicle speed on the road where the own vehicle is traveling, based on the road information detected by the road information detecting unit 21. For example, the proper vehicle speed determining unit 23 detects a proper vehicle speed from a speed limit of the road, which is obtained from road signs or other information included in the road information, an inter-vehicle distance from a preceding vehicle, which is recognized by another vehicle recognizing unit, and the type of the traveling road of the own vehicle, such as, for example, a highway, a slope, a tunnel, or a curved path. The proper vehicle speed determining unit 23 compares the proper vehicle speed to the own vehicle speed detected by the travelling state detecting unit 22 so as to determine whether the current speed of the own vehicle is proper or not.

The proper steering determining unit 24 determines whether the current travelling direction of the own vehicle is a proper steering direction in which the own vehicle is avoided in advance from coming in contact with a parallel running vehicle or colliding with an oncoming vehicle without deviating from the lane of the own vehicle beyond left and right lane lines marked on the road surface, based on the lane lines marked on the road, which are detected by the road information detecting unit 21, oncoming vehicles or parallel running vehicles, which are detected by the road information detecting unit 21, and the steering direction (the travelling direction) of the own vehicle, which is detected by the travelling state detecting unit 22.

The driving support ECU 2 is provided with a projector control unit 25, as a projection control unit of the present disclosure, which is configured to control the supporting pattern projected by the projector 1 based on determination results of the proper vehicle speed determining unit 23 and the proper steering determining unit 24. The projector control unit 25 is configured to control the projector 1 so as to project a predetermined supporting pattern as a still image or a moving image. Here, the still image and the moving image refer to an image, of which the relative position in relation to the own vehicle, or an occupant of the own vehicle, especially the driver is fixed, and an image, of which the relative position in relation to the own vehicle, or the occupant of the own vehicle, especially the driver is variable, respectively. The variation of the relative value may be either a continuous variation or an intermittent variation. The projector control unit 25 is configured to project a supporting pattern suitable for supporting a proper vehicle speed and a supporting pattern suitable for supporting proper steering, as supporting patterns of the present disclosure.

Figure 3A:
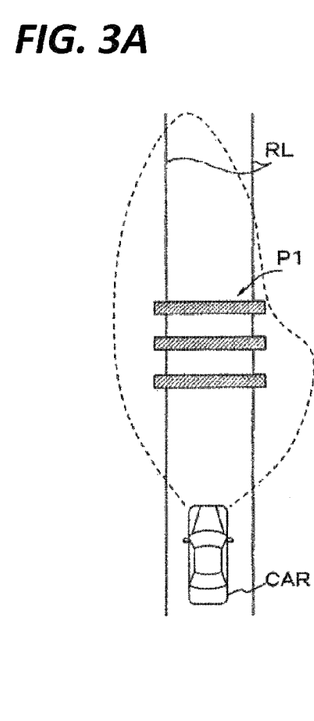
FIGS. 3A to 3D are plan views illustrating exemplary projected supporting patterns of the present disclosure.
Figure 3B:
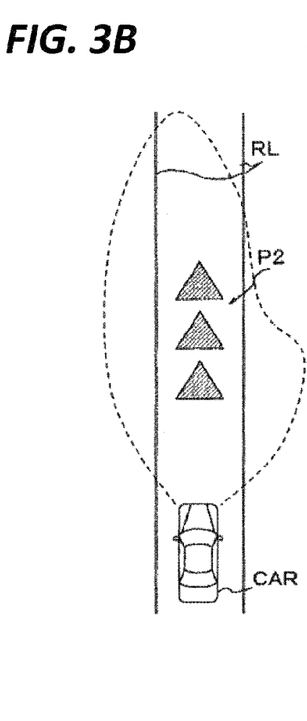
Figure 3C:
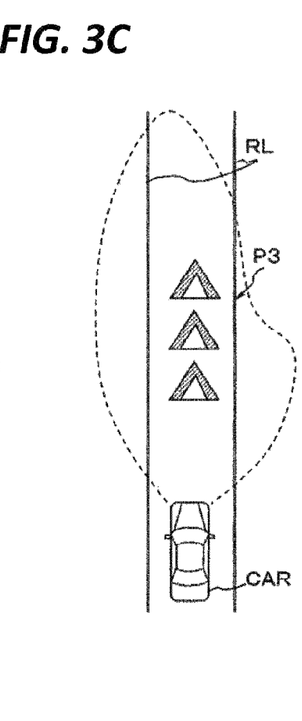
Figure 3D:
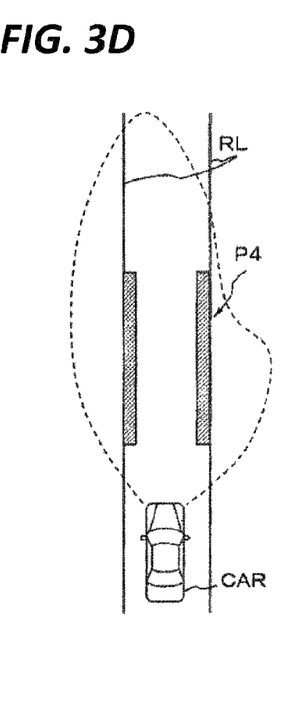

FIGS. 3A to 3D are views illustrating exemplary supporting patterns. Here, each supporting pattern includes a plurality of supporting patterns projected in an arranged state on the road surface at the front area of the own vehicle CAR. For example, the supporting patterns suitable for supporting the proper vehicle speed may be three horizontal bar-shaped patterns P1 which extend horizontally and are arranged at predetermined intervals along the forward and backward directions of a travelling lane region of the own vehicle CAR, as illustrated in FIG. 3A. Also, the supporting patterns suitable for supporting the proper vehicle speed may be three triangular patterns P2 which are arranged such that their apexes are directed in the traveling direction, as illustrated in FIG. 3B, or three triangular arrow patterns P3 which are arranged such that their front ends are directed in the traveling direction, as illustrated in FIG. 3C. For example, the supporting patterns suitable for supporting the proper steering may be two longitudinal bar-shaped patterns which extend longitudinally at left and right sides ahead of the own vehicle on the road surface of the front area of the own vehicle CAR as if imitating lane lines RL, as illustrated in FIG. 3D.

Figure 4A:
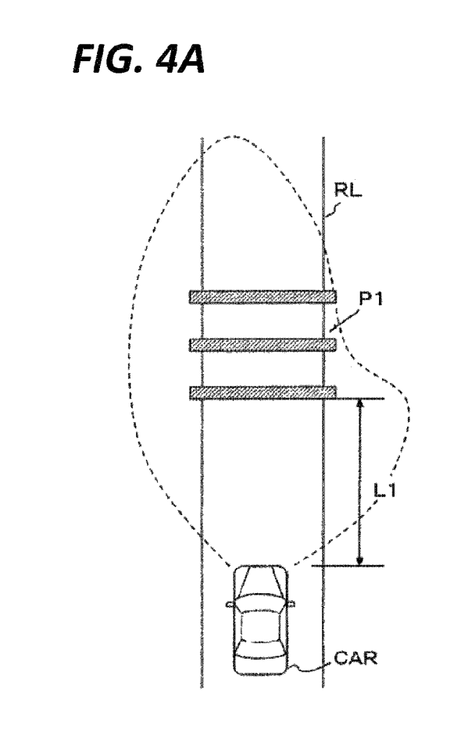
FIGS. 4A to 4C are plan views illustrating supporting patterns which are projected under a proper vehicle speed control at a high speed.

Hereinafter, descriptions will be made on supporting of the proper vehicle speed by the driving support apparatus described above. When the driver needs supporting of a vehicle speed, the driving support ECU 2 is set as a proper vehicle speed supporting mode. In response to this, the driving support ECU 2 projects the supporting patterns P1 suitable for supporting the proper vehicle speed on the road surface ahead of the own vehicle by the projector 1 according to travelling of the own vehicle CAR, as illustrated in FIG. 4A. Here, the horizontal bar-shaped supporting patterns P1 as illustrated in FIG. 3A are projected and fall within a front visibility of the driver to be visually recognized by the driver.

The proper vehicle speed determining unit 23 of the driving support ECU 2 calculates a vehicle speed difference between the proper vehicle speed and the current speed of the own vehicle, and determines whether the speed of the own vehicle is a proper vehicle speed based on the vehicle speed difference. In the determination, as for a range of the proper vehicle speed, an allowable range with a predetermined vehicle speed width is set in advance. When the vehicle speed difference is within the allowable range, it is determined that the speed is in the proper vehicle speed state, when the vehicle speed difference is at a higher speed side than the allowable range, it is determined that the speed is in the high speed state, and when the difference is at a lower speed side, it is determined that the speed is in the low speed state.

The projector control unit 25 controls the projection of the supporting patterns in the projector 1 based on the determination result in the proper vehicle speed determining unit 23. When it is determined that the current speed of the own vehicle is in the proper vehicle speed state, the supporting patterns are projected at a location a predetermined distance ahead of the own vehicle CAR. Here, as illustrated in FIG. 4A, the supporting patterns P1 are projected at a location where a predetermined distance L1 ahead of the own vehicle CAR is shortest. The predetermined distance L1 is a fixedly set distance. Accordingly, the supporting patterns P1 are projected as a still image on the road surface ahead of the own vehicle.

In this manner, when the supporting patterns P1 are projected based on the vehicle speed state of the own vehicle CAR, the supporting patterns P1 are projected at a location a predetermined distance L1 ahead of the own vehicle CAR in the proper vehicle speed state. Thus, during travelling of the own vehicle CAR, the driver visually recognizes the supporting patterns as if the supporting patterns P1 move together with the own vehicle CAR at the front area of the own vehicle. Therefore, the driver is not under a delusion about the speed of the own vehicle CAR. Then, the own vehicle may travel at a vehicle speed recognized by the driver. At this time, since the vehicle speed is within the allowable range of the proper vehicle speed, it is natural that the safe travelling is ensured.

Figure 4B:
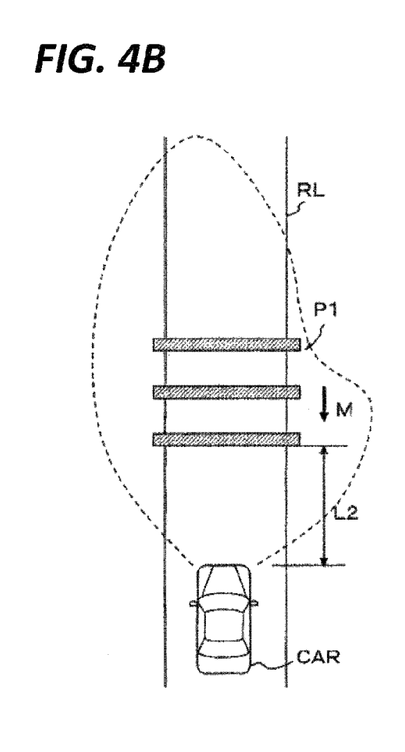
Figure 4C:
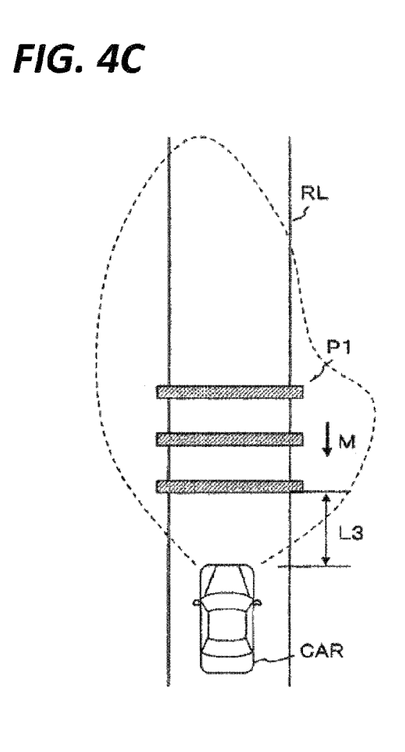

Meanwhile, when it is determined that the vehicle speed is in the high speed state by the proper vehicle speed determining unit 23, the projector control unit 25 projects the supporting patterns P1 such that the projection locations of the supporting patterns P1 are gradually approaching the own vehicle CAR with elapse of time. That is, as illustrated in FIGS. 4B and 4C, the projector control unit 25 causes the predetermined distance L1 ahead of the own vehicle CAR to be gradually decreased in the order of L2 and L3 (L1>L2>L3). That is, the supporting patterns P1 are projected as a moving image such that the driver visually recognizes the supporting patterns P1 gradually approaching from a far front area toward the own vehicle, as indicated by M. Herein, for example, among the three supporting patterns P1, one supporting pattern which has moved to a location immediately ahead of the own vehicle CAR disappears, and another supporting pattern is newly projected on the far front area. That is, the projection is performed such that the three supporting patterns P1 are continuously moved from the far front area to the location immediately ahead of the vehicle. The movement speed of the supporting patterns P1 is determined according to a vehicle speed difference between the proper vehicle speed and the current speed of the own vehicle CAR. That is, as the vehicle speed difference increases, the movement speed increases when the supporting patterns P1 are approaching the own vehicle, and as the vehicle speed difference decreases, the movement speed decreases.

As described above, when the current speed of the own vehicle CAR is higher than the proper vehicle speed, the driver visually recognizes the supporting patterns P1 as if the supporting patters P1 move and approach from the far front location to the location immediately ahead of the own vehicle CAR. Thus, the driver deludes himself/herself that the own vehicle CAR is traveling at a speed higher than an actual vehicle speed. Accordingly, the driver inevitably stops pressing the accelerator, or operates the brake to slow down the own vehicle. As the vehicle speed difference increases, the approaching speed of the supporting patterns P1 increases. Thus, the deceleration operation by the driver is more quickly performed. This is continuously performed while the supporting patterns P1 are moving toward the own vehicle, until the movement of the supporting patterns P1 is stopped. As a result, the speed of the own vehicle becomes a proper vehicle speed.

Figure 5A:
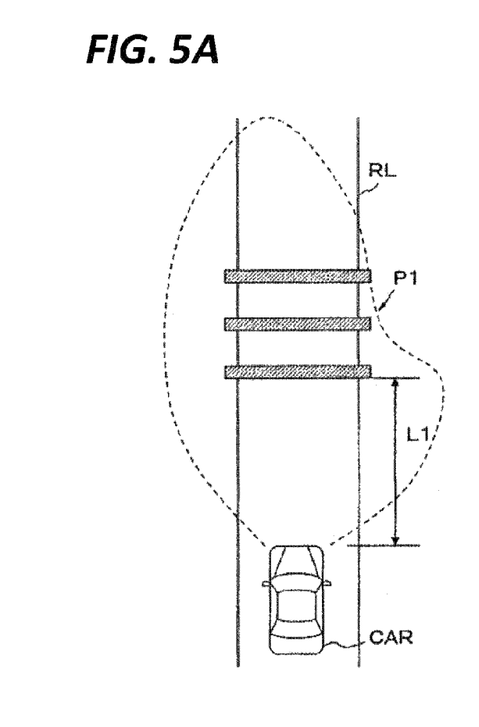
FIGS. 5A to 5C are plan views illustrating supporting patterns which are projected under a proper vehicle speed control at a low speed.
Figure 5B:
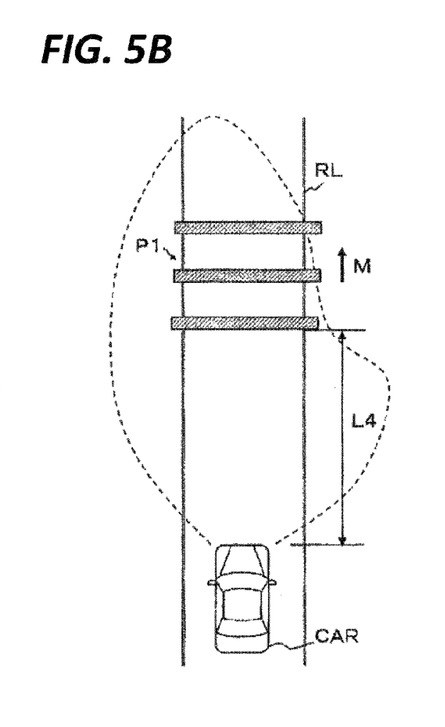
Figure 5C:
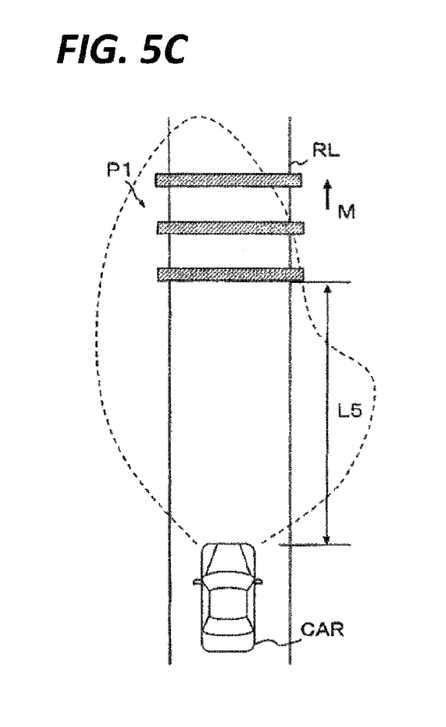

On the contrary, when it is determined that the vehicle speed is in the low speed state by the proper vehicle speed determining unit 23, the projector control unit 25 projects the supporting patterns P1 such that the projection locations of the supporting patterns P1 are gradually receding from the state of FIG. 5A (which is the same as in FIG. 4A) with elapse of time, as illustrated in FIGS. 5B and 5C. That is, the projector control unit 25 causes the predetermined distance L1 ahead of the own vehicle CAR to be gradually increased in the order of predetermined distances L4 and L5 (L1<L4<L5). That is, the supporting patterns P1 are projected as a moving image such that the driver visually recognizes the supporting patterns P1 gradually receding toward a far front area from the location immediately ahead of the own vehicle CAR, as indicated by M. Herein, for example, among the three supporting patterns P1, one supporting pattern which has moved to the front area far from the own vehicle disappears, and another supporting pattern is newly projected on the location immediately ahead of the own vehicle. That is, the projection may be performed such that the supporting patterns P1 are continuously moved from the location immediately ahead of the own vehicle to the far front area. Also in this case, the movement speed of the supporting patterns P1 is determined according to the vehicle speed difference between the proper vehicle speed and the current vehicle speed. That is, as the vehicle speed difference increases, the movement speed increases when the supporting patterns P1 are receding, and as the vehicle speed difference decreases, the movement speed decreases.

As described above, when the current speed of the own vehicle CAR is lower than the proper vehicle speed, the driver visually recognizes the supporting patterns P1 as if the supporting patterns P1 move to recede from the location immediately ahead of the own vehicle CAR to the far front location. Thus, the driver deludes himself/herself that the own vehicle CAR is traveling at a speed lower than an actual vehicle speed. Accordingly, the driver inevitably stops operating the brake or operates the accelerator to speed up the own vehicle. As the vehicle speed difference increases, the speed of the supporting patterns P1 receding toward the far front area increases. Thus, the acceleration operation by the driver is more quickly performed. This is continuously performed while the supporting patterns P1 are moving toward the far area, until movement of the supporting patterns P1 is stopped. As a result, the speed of the own vehicle becomes a proper vehicle speed.

As described above, when the own vehicle CAR is traveling at a vehicle speed out of the allowable range of the proper vehicle speed, the supporting patterns P1 are projected as a moving image so that the driver deludes himself/herself and performs an operation to cope with the delusion. Then, the speed of the own vehicle CAR becomes a proper vehicle speed. Accordingly, when the driving support ECU 2 controls the projection of the supporting patterns P1 based on the relationship between an inter-vehicle distance from a preceding vehicle and a vehicle speed, the own vehicle CAR may have a vehicle speed at which a proper inter-vehicle distance from the preceding vehicle may be maintained. Thus, the own vehicle CAR may be suppressed, in advance, from rear-ending the preceding vehicle. Alternatively, when the driver does not recognize that the vehicle speed is slowing down during traveling on a tunnel or a slope, the driving support ECU 2 may control the projection of the supporting pattern P1 to accelerate the vehicle speed up to a proper vehicle speed so that a natural traffic jam or a rear-ending from a following vehicle may be suppressed in advance.

Here, the support of the proper vehicle speed may employ the supporting patterns P2 and P3 illustrated in FIGS. 3B and 3C, besides the supporting patterns P1. Otherwise, the support may employ other types of patterns not illustrated in FIGS. 3A to 3D.

Hereinafter, the support for proper steering will be described. When a driver sets the driving support ECU 2 to a proper steering supporting mode, the driving support ECU 2 projects direction supporting patterns on the road surface ahead of the own vehicle by the projector 1. That is, the driving support ECU 2 controls the proper steering determining unit 24 so as to determine whether the current steering direction of the own vehicle is a proper direction in which the own vehicle does not deviate from the lane and thus is avoided in advance from coming in contact with a parallel running vehicle or colliding with an oncoming vehicle, based on lanes, oncoming vehicles or parallel running vehicles, which are detected by the road information detecting unit 21, and the steering direction (the travelling direction) of the own vehicle, which is detected by the travelling state detecting unit 22. When there is no risk of deviation from a lane, the proper steering determining unit 24 determines that the current steering direction is a proper direction. Also, when the steering direction deviates from the lane to the right, the proper steering determining unit 24 determines that the steering direction is in the rightward state, and when the steering direction deviates from the lane to the left, the proper steering determining unit 24 determines that the steering direction is in the leftward state.

Figure 6A:
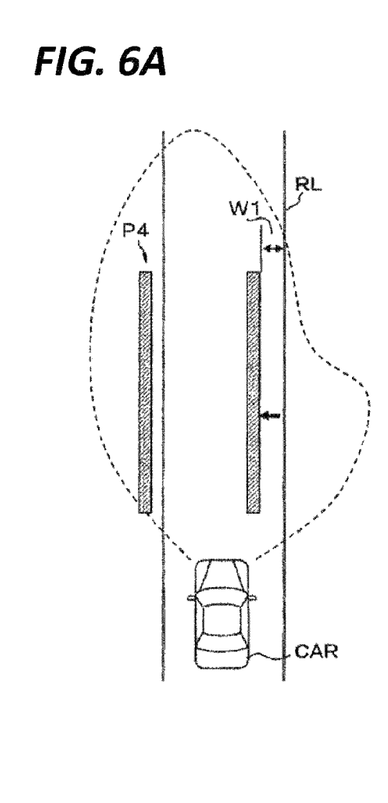
FIGS. 6A to 6C are plan views illustrating supporting patterns which are projected under a proper steering control.
Figure 6B:
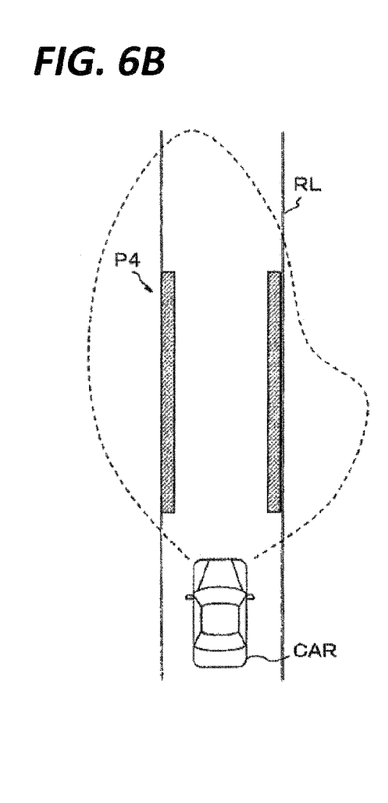

The projector control unit 25 controls the projection of the supporting patterns based on the determination result in the proper steering determining unit 24. Here, the supporting patterns P4 illustrated in FIG. 3D are projected on the road surface ahead of the own vehicle CAR. When it is determined that the current steering direction of the own vehicle is proper, the supporting patterns P4 are projected at a location in a predetermined direction ahead of the own vehicle CAR, as illustrated in FIG. 6B. The location in the predetermined direction is based on a direction set in advance. Here, two supporting patterns P4 are projected as a still image with respect to the own vehicle CAR. When the own vehicle CAR is traveling on a road marked with left and right land lines RL, the two left and right supporting patterns P4 are projected on locations overlapping the lane lines RL.

As described above, when the supporting patterns P4 are projected based on the lane lines RL and the steering angle of the own vehicle CAR, in the proper steering state, the supporting patterns P4 are projected as a still image at left and right locations in a predetermined direction to overlap the lane lines RL ahead of the own vehicle CAR. Thus, the driver may visually recognize the supporting patterns P4 as a part of the lane lines RL without deluding himself/herself about the steering direction of the own vehicle. Accordingly, the own vehicle may travel at a steering angle recognized by the driver, and does not deviate from the lane to the left or right side, thereby ensuring the safe travelling.

Figure 6C:
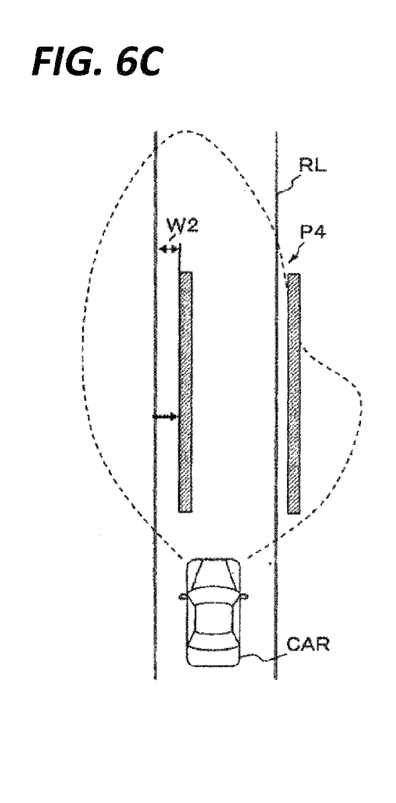

When the proper steering determining unit 24 determines that the steering direction of the own vehicle CAR is in the leftward state, the projector control unit 25 projects the supporting patterns P4 such that the supporting patterns P4 are gradually moved from the left side to the right side with elapse of time. The supporting patterns P4 are projected as a moving image such that the driver visually recognizes, at the front area, that the supporting patterns P4 are moving rightwards with respect to the lane lines RL and their displacement values W2 are gradually increasing, as illustrated in FIG. 6C. In this manner, when the driver visually recognizes that the supporting patterns P4 move from the left side to the right side, the driver deludes himself/herself that the left lane line RL is approaching the own vehicle CAR, that is, the own vehicle is steered further leftward from an actual steering direction. Based on the delusion, the driver inevitably operates the steering to the right to cope with the delusion so that the steering direction of the own vehicle CAR may be directed toward the right side. This is continuously performed while the supporting patterns P4 are moving from the left side to the right side, until movement of the supporting patterns is stopped. As a result, the steering direction of the own vehicle becomes proper.

On the contrary, when the proper steering determining unit 24 determines that the steering direction of the own vehicle CAR is in the rightward state, the projector control unit 25 projects the supporting patterns P4 such that the supporting patterns P4 are gradually moved from the right side to the left side with elapse of time. That is, the supporting patterns P4 are projected as a moving image such that the driver visually recognizes, at the front area, that the supporting patterns P4 are moving leftwards with respect to the lane lines RL and their displacement values W1 are gradually increasing, as illustrated in FIG. 6A. In this manner, when the driver visually recognizes that the supporting patterns P4 move from the right side to the left side, the driver deludes himself/herself that the right lane line RL is approaching the own vehicle CAR, that is, the own vehicle is steered further rightward from an actual steering direction. Based on the delusion, the driver inevitably operates the steering to the left to cope with the delusion so that the travelling direction of the own vehicle CAR may be directed toward the left side. This is continuously performed while the supporting patterns P4 are moving from the right side to the left side, until movement of the supporting patterns P4 is stopped. As a result, the steering direction of the own vehicle becomes proper.

Also in this case, the variation rates of the displacement values W1 and W2 as described above may be changed according to the magnitude of the difference in a steering angle between a proper steering direction and a current steering direction, so that the driver may quickly and properly correct the steering.

As described above, when the own vehicle is steered in a direction which does not deviate from the lane, the supporting patterns may be projected as a still image on fixed locations, so that the steering state may be effectively maintained. When the own vehicle is directed to deviate from the lane to the right or to the left, the supporting patterns are projected as a moving image which moves leftward or rightward so that the driver deludes himself/herself and performs steering in a direction opposite to the deviation direction. Accordingly, the own vehicle may be suppressed from deviating from the lane to collide with the oncoming vehicle or come in contact with the parallel running vehicle, thereby ensuring safe travelling.

In the exemplary embodiment described above, the support for the proper vehicle speed and the support for the proper steering are performed independently from each other. However, a configuration in which the support for the proper vehicle speed and the support for the proper steering are performed at once may be employed. For example, when the speed of the own vehicle is higher than the proper vehicle speed, and the steering angle is directed rightwards with respect to the lane, projection is performed such that the supporting patterns are approaching from the right far front area toward the left location immediately ahead of the own vehicle. Accordingly, the driver may delude himself/herself that the own vehicle is traveling at an excessive speed in a direction deviating from the lane to the right and may perform a corresponding operation to ensure safe travelling. This also may be similarly applied to a case where the vehicle speed is higher than the proper vehicle speed, and the steering is directed leftwards, or a case where the vehicle speed is lower than the proper vehicle speed, and the steering is directed rightwards or leftwards. Such a driving support may employ not only the supporting patterns P4, but also other supporting patterns P1 to P3.

In this exemplary embodiment, the projector 1 is integrally provided in the right head lamp R-HL, but may be provided in the left head lamp L-HL. Also, the projector 1 may be integrally provided in another lamp such as a fog lamp as long as it can project a supporting pattern on the road surface at the front area of the automobile. Alternatively, the projector 1 may be provided in the vehicle independently from a lamp.

The projector of the present disclosure may be configured as a part of a lamp unit of a head lamp. That is, the dashed line in each of FIGS. 3A to 3D indicates a light distribution region illuminated by the lamp unit 11, in which a supporting pattern may be projected as a part of the light distribution. For example, although not illustrated, when the lamp unit is configured as a high resolution LED array, a part of the LED array may be controlled to have a different light intensity from the rest of the LED array so that a supporting pattern having higher brightness or lower brightness may be projected within the light distribution region illuminated by the lamp unit. Then, when the supporting pattern is moved as a moving image, the LED may be switched to project the supporting pattern. When the lamp unit is configured as an LED array as described above, the present disclosure may be employed without complicating the structure of the lamp unit which only requires the change of the control program of the driving support ECU.

Although not illustrated, in a case of a shading-type lamp unit configured to shade a part of a light source to obtain a required light distribution, a part of the illumination light may be partially dimmed by, for example, a sub-shade to project a supporting pattern with a low brightness. For example, the sub-shade may be moved up and down or side to side in the lamp unit so that the supporting pattern may be moved back and forth or side to side in the light distribution caused by the lamp unit. The shading-type lamp unit needs a mechanism for moving the sub-shade, and thus has a slightly complicated structure. However, in the case of the shading-type lamp unit, the size of the head lamp may be reduced compared to that in a case where a separate projector is provided.

As described above, in the case where the supporting pattern is projected as a part of light distribution of a lamp unit, when a head lamp is turned on at nighttime, the supporting pattern needs to be projected in the light distribution of the head lamp only if support is required. When the head lamp is not turned on at daytime, the head lamp needs to be turned on and the supporting pattern needs to be projected only if support is required.

As in this exemplary embodiment, in the case where the supporting pattern is projected as a part of the light distribution of the lamp unit, the supporting pattern may be recognized as an integral part to the own vehicle. Thus, it is considered to control a movement direction of the supporting pattern to a direction opposite to that of the above described exemplary embodiment when the supporting pattern is projected as a moving image. For example, a supporting pattern P5 illustrated in FIG. 7B is formed as an arrow pattern which is projected at the central position in the left and right directions in a region immediately ahead of the own vehicle CAR, unlike the patterns imitating the lane lines as illustrated in FIG. 3D. In the case where the supporting pattern P5 is employed in proper steering support and projected, when the driver continuously travels in some time while visually recognizing the supporting pattern P5, the supporting pattern P5 is visually recognized as if it moves together with the own vehicle CAR forwards. Thus, the supporting pattern P5 is recognized as an integral part to the own vehicle CAR.

Figure 7A:
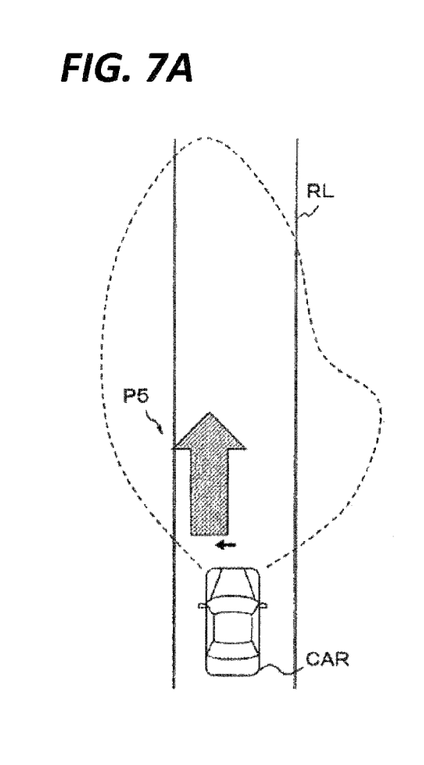
FIGS. 7A to 7C are plan views illustrating other supporting patterns projected under a proper steering control.
Figure 7B:
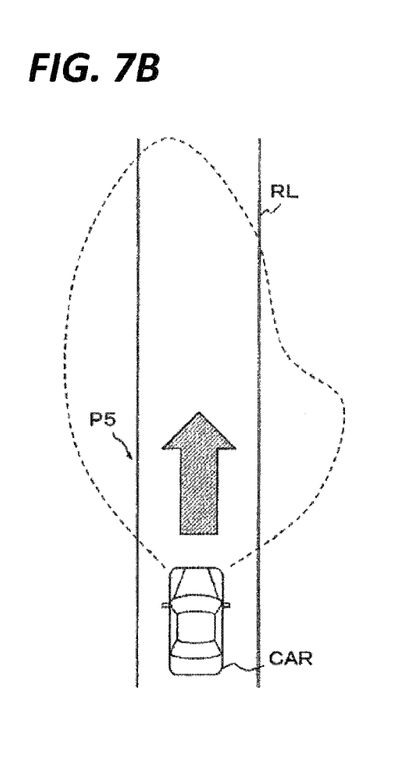
Figure 7C:
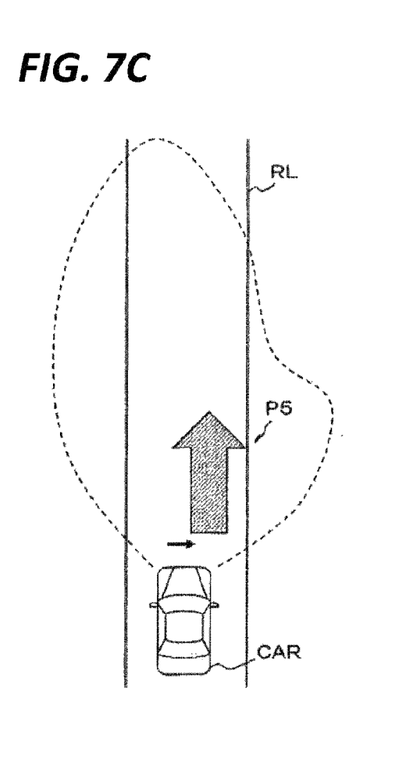

Accordingly, as illustrated in FIG. 7A, when the supporting pattern P5 is moved by the driving support ECU 2 from the central position to the left, the driver deludes himself/herself that the own vehicle CAR is steering to the left, and performs steering to the right so as to correct the steering to the left. Accordingly, when the own vehicle is oriented to a direction deviating from the lane lines RL to the left, the driving support ECU 2 may move the supporting pattern P5 from the central position in the left and right directions to the left where the own vehicle is oriented. Then, the driver may perform steering to the right to suppress the own vehicle CAR from deviating from the lane. On the contrary, when the own vehicle is oriented to a direction deviating from the lane lines RL to the right, the driving support ECU 2 may move the supporting pattern P5 from the central position in the left and right directions to the right where the own vehicle CAR is oriented as illustrated in FIG. 7C. Then, the driver may perform steering to the left to suppress the own vehicle from deviating from the lane.

Theoretically, it may be said that the driving support through such a supporting pattern projection may be similarly applied to control of the proper vehicle speed support. However, in the proper vehicle speed support, the supporting pattern is projected while being moved in the forward and backward directions of the own vehicle, and thus it is difficult for a driver to recognize the supporting pattern as a part of the own vehicle. Accordingly, in the proper vehicle speed support, it is preferable that the supporting pattern is projected as in exemplary embodiments illustrated in FIGS. 4A to 4C and FIGS. 5A to 5C.

Here, in the shading-type lamp unit, a swivel device for deflecting the lamp unit in the horizontal direction (in the left and right directions in light distribution) or a leveling device for deflecting the lamp unit in the vertical direction (in the forward and backward directions in light distribution) may be used as for a component for moving the supporting pattern back and forth or side to side. For example, in order to move the supporting pattern toward the front side of the own vehicle, the supporting pattern may not be projected when the optical axis of the lamp unit is deflected upward, and the supporting pattern may be projected when the optical axis is deflected downward, while the optical axis of the lamp unit is repeatedly being deflected up and down at a high speed by the leveling device. This operation may be performed in reverse so as to move the supporting pattern toward the distant side. Also, in order to move the supporting pattern side to side, the swivel device may be used for a similar purpose.

The supporting pattern applied to the present disclosure is not limited to the patterns described in exemplary embodiments. Any pattern may be employed as long as it can be projected on a front area of the own vehicle, and can make the driver delude himself/herself about a vehicle speed or a steering direction of the own vehicle when projected as a moving image moving back and force or side to side. The supporting pattern may be configured to be projected on a front window (a head-up display) of the own vehicle rather than being projected on the road surface ahead of the own vehicle, as long as the supporting pattern may be visually recognizable by an occupant of the own vehicle, especially the driver. The present disclosure also may be applied to motorcycles.

The present disclosure may be employed in a vehicle such as, for example, an automobile, which travels through a steering operation and a vehicle speed operation performed by a driver who visually recognizes a road surface of a front area of an own vehicle, or the front area through the front window.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A driving support apparatus comprising:
a projecting unit configured to project a predetermined support pattern on a road surface ahead of an own vehicle or a front window of the own vehicle; and
a driving support control unit configured to control a projection state of the support pattern,
wherein the driving support control unit includes: a road information detecting unit configured to detect information of a road on which the own vehicle is travelling; a travelling state detecting unit configured to detect a traveling state of the own vehicle, the traveling state including at least one of a vehicle speed and a steering direction; a proper state determining unit configured to determine a proper vehicle speed and proper steering of the own vehicle based on the information of the road and the traveling state; and a projection control unit configured to project the support pattern as a moving image based on determination by the proper state determining unit.

2. The driving support apparatus of claim 1, wherein the projection control unit is configured to control the projecting unit to project the support pattern as a moving image moving in forward and backward directions of the own vehicle, or as a moving image moving in left and right directions of the own vehicle.

3. The driving support apparatus of claim 2, wherein the projection control unit is configured to control the projecting unit to project the support pattern as a moving image moving in the forward and backward directions of the own vehicle when the vehicle speed of the own vehicle is out of the proper vehicle speed.

4. The driving support apparatus of claim 2, wherein the projection control unit is configured to control the projecting unit to project the support pattern as a moving image moving in the left and right directions of the own vehicle when the steering direction of the own vehicle is out of the proper steering.

5. The driving support apparatus of claim 1, wherein at least the projecting unit is provided integrally with a lamp.

6. The driving support apparatus of claim 2, wherein at least the projecting unit is provided integrally with a lamp.

7. The driving support apparatus of claim 3, wherein at least the projecting unit is provided integrally with a lamp.

8. The driving support apparatus of claim 4, wherein at least the projecting unit is provided integrally with a lamp.

9. The driving support apparatus of claim 5, wherein the projecting unit includes a projector.

10. The driving support apparatus of claim 6, wherein the projecting unit includes a projector.

11. The driving support apparatus of claim 7, wherein the projecting unit includes a projector.

12. The driving support apparatus of claim 8, wherein the projecting unit includes a projector.

* * * * *